July 24, 1962  F. W. STAGER ETAL  3,046,060
AUTOMOBILE ANTI-SKID CONTROL ASSEMBLY
Filed June 16, 1961  2 Sheets-Sheet 1
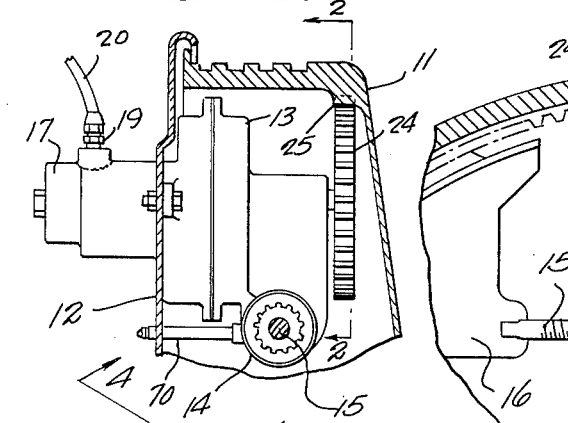
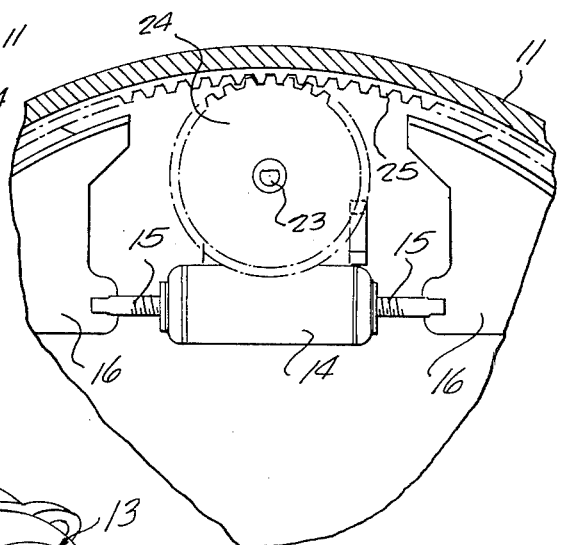
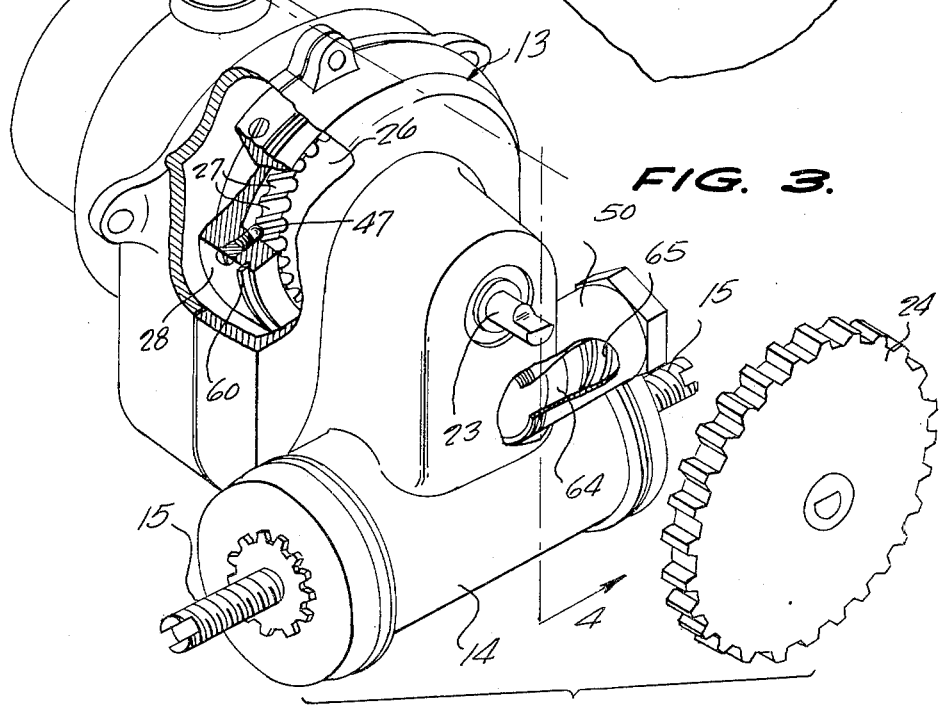
INVENTORS
ROBERT N. MINOR,
THOMAS A. MINOR,
FRANCIS W. STAGER,
BY
McMorrow, Berman & Davidson
ATTORNEYS.

July 24, 1962 F. W. STAGER ETAL 3,046,060
AUTOMOBILE ANTI-SKID CONTROL ASSEMBLY
Filed June 16, 1961 2 Sheets-Sheet 2
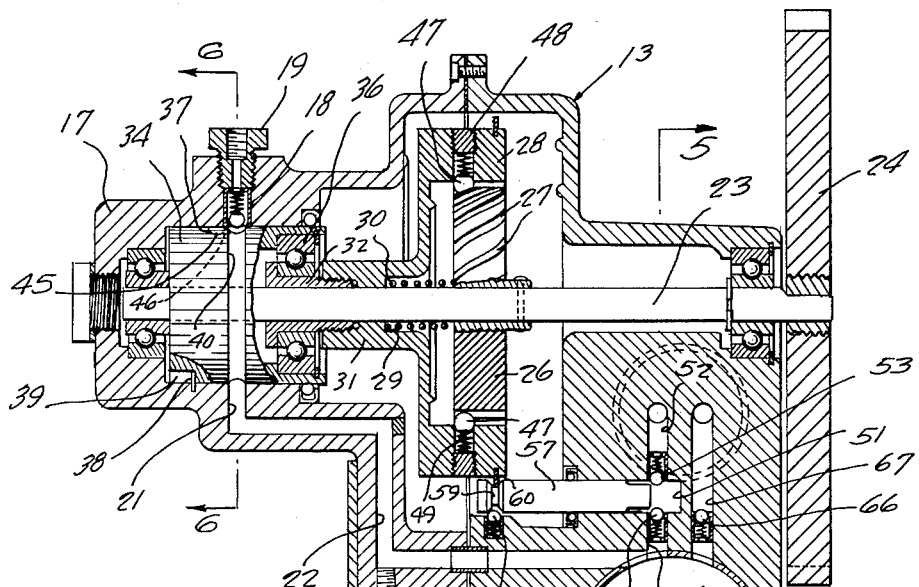
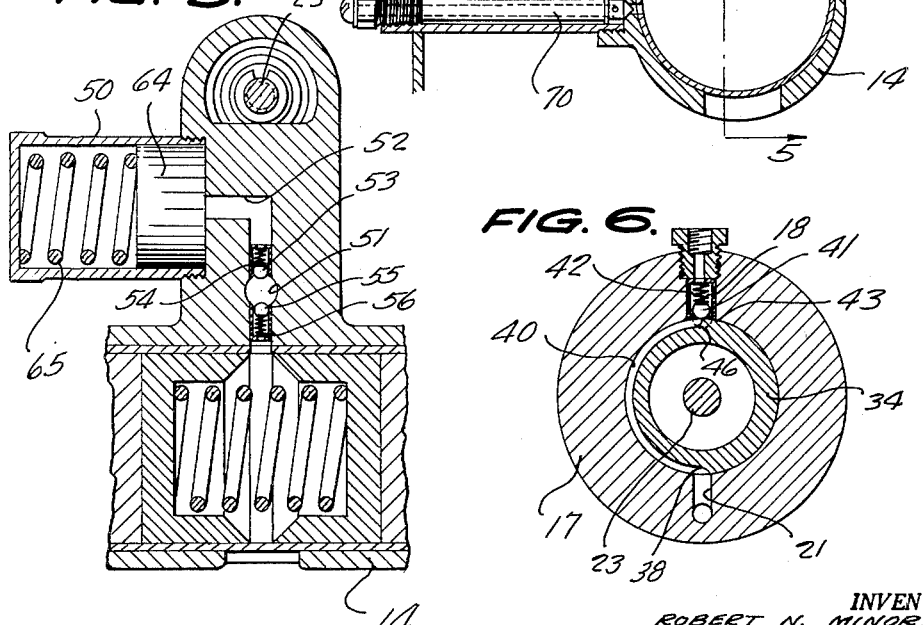
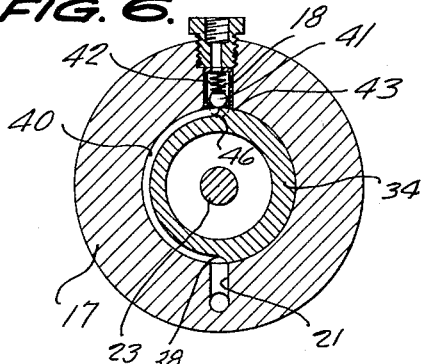
INVENTORS
ROBERT N. MINOR,
THOMAS A. MINOR,
FRANCIS W. STAGER,
BY
McMorrow, Berman & Davidson
ATTORNEYS.

United States Patent Office  3,046,060
Patented July 24, 1962

3,046,060
AUTOMOBILE ANTI-SKID CONTROL ASSEMBLY
Francis W. Stager, Rte. 1, Stafford Springs, Conn., and Robert N. Minor and Thomas A. Minor, both of R.F.D. 2, Rockville, Conn.
Filed June 16, 1961, Ser. No. 117,607
7 Claims. (Cl. 303—21)

This invention relates to automobile braking systems, and more particularly to a device for automatically cutting off the application of braking force to an automobile wheel whenever the wheel decelerates relatively rapidly or tends to skid.

A main object of the invention is to provide a novel and improved skid-detecting device for use with an automobile wheel, said device being relatively simple in construction, being easy to install on existing automobiles, and involving a relatively small number of moving parts.

A further object of the invention is to provide an improved anti-skid assembly for use with an automobile wheel, said assembly including means for positively detecting a skid condition, being reliable in operation to automatically interrupt the application of braking force to the wheel under a skid condition, and requiring a minimum amount of maintenance.

A still further object of the invention is to provide an improved anti-skid device for use with an automobile wheel, said device being inexpensive to manufacture, being compact in size, being substantially completely self-contained in a single assembly, and being relatively easy to mount in an automobile wheel.

A still further object of the invention is to provide an improved anti-skid assembly for use with an automobile wheel, said assembly providing positive skid detection, being arranged so that it can be readily installed in an automobile wheel without requiring radical modifications of adjacent components of the wheel, causing no loss of hydraulic fluid to the associated brake system when used, providing positive valve control, so that it operates in a positive and reliable manner under skid conditions, being easy to assemble or disassemble, and being substantially completely sealed against the entry of all dirt or foreign material.

A still further object of the invention is to provide an improved anti-skid assembly adapted to be employed with an automobile wheel to independently control the wheel so that the application of braking force is automatically interrupted thereto when the wheel begins to skid, being arranged so that it requires no adjustment of its components after it has been installed, and utilizing only the physical forces developed by the automobile for its operation.

A still further object of the invention is to provide an improved anti-skid assembly for use with an automobile wheel to automatically interrupt the application of braking force to the wheel whenever rapid deceleration or skidding of the wheel occurs, the device being adapted for installation in any standard automobile wheel, using readily replaceable standard parts, and being designed so that the fabrication of the elements of the device does not require close or critical tolerance values.

Further objects and advantages of the invention will become apparent from the following description and claims, and from the accompanying drawings, wherein:

FIGURE 1 is a vertical cross sectional view taken through the upper portion of an automobile wheel assembly provided with an improved anti-skid device in accordance with the present invention.

FIGURE 2 is a vertical cross sectional view taken substantially on the line 2—2 of FIGURE 1.

FIGURE 3 is an enlarged perspective view, with parts broken away and with the drive gear detached of the anti-skid assembly illustrated in FIGURES 1 and 2.

FIGURE 4 is a vertical longitudinal cross sectional view taken substantially on the line 4—4 of FIGURE 3.

FIGURE 5 is a transverse vertical cross sectional view taken on the line 5—5 of FIGURE 4.

FIGURE 6 is a transverse vertical cross sectional view taken on the line 6—6 of FIGURE 4.

Referring to the drawings, and more particularly to FIGURES 1 and 2, 11 designates a brake drum associated with one of the wheels of an automobile, and 12 designates the automobile wheel backing plate which is secured to the frame of the vehicle in accordance with the usual construction. Secured to the backing plate 12 is a housing member 13 which includes a conventional double-acting brake cylinder 14 containing a pair of pistons whose rods 15, 15 are operatively connected to respective brake shoes 16, 16 engageable with the inside surface of the brake drum 11 responsive to the extension of the piston rods 15, 15. Housing 13 is formed with a laterally projecting portion 17 which extends through the backing plate 12 and which is formed with a top fluid inlet port 18 provided with a conduit fitting 19 to which is connected the flexible conduit 20 leading to the brake fluid supply source, for example, to the master cylinder of the vehicle. Housing portion 17 is formed diametrically opposite the port 18 with a port 21 communicating with a passage 22 leading to the intermediate portion of the double-acting brake cylinder 14.

Rotatably mounted in the housing 13 is a shaft 23 to the end of which is secured a drive gear 24 which meshes with internal gear teeth 25 formed on the inside cylindrical wall of drum 11, whereby the shaft 23 is drivingly coupled to the drum 11. Secured on the shaft 23 is a cam wheel 26 formed on its peripheral surface with helical grooves 27. Designated at 28 is an annular flywheel which is rotatably and slidably mounted on the shaft 23 and which normally receives the cam wheel 26, as shown in FIGURE 4. A coiled spring 29 surrounds the intermediate portion of the shaft 23, bearing between the cam wheel 26 and the inner wall of a central recess 30 formed in the main cavity of the annular flywheel 28, biasing the flywheel to the left, as viewed in FIGURE 4, namely, away from the cam wheel 26.

Threadedly secured in the supporting sleeve portion 31 of the flywheel 28 is a flanged bushing 32 which slidably and rotatably engages on the shaft 23 along with the sleeve portion 31. Designated at 34 is a sleeve member which is rotatably connected to the flanged bushing 32 by a ball bearing assembly 36, the sleeve member 34 being slidably received in the inside cavity 37 of housing portion 17 and being retained against rotation in said cavity by a pin member 38 secured in the cavity and engaging in a longitudinal groove 39 provided in the sleeve member 34. The sleeve member 34 is formed with a peripheral channel 40 which normally communicatively connects port 18 with port 21 so that brake fluid may flow from the supply conduit 20 to the intermediate portion of the brake cylinder 14 when the control device associated with the brake system, for example, the brake pedal, is actuated.

As shown in FIGURE 6, a ball valve 41 is provided in the port 18, the ball valve being urged inwardly by a coiled spring 42 but normally being held in unseated position by engagement with the peripheral surface 43 of sleeve 34 adjacent to the top end of the channel 40. The sleeve member 34 is formed with a detent recess 45 longitudinally aligned with the ball valve 41 and connected to the channel 40 by a short relief channel 46 formed longitudinally on the periphery of the sleeve 34. When the sleeve 34 is moved to the right from the position thereof shown in FIGURE 4, the ball element 41 will engage in the recess 45, allowing the ball element to close off the port 18 and to disconnect port 21 from the fluid pressure supply conduit 20. Under these conditions, the peripheral channel 40 is moved to the right so that it is sealed off, cutting off the communication between the ports 18 and 21. The ball element 41 acts as a yieldable locking means to retain the sleeve member 34 in its sealing position.

The flywheel 28 is provided with pairs of diametrically opposed, inwardly projecting coupling ball elements 47, 47 which are disposed in radial passages 48 provided in the annular flywheel 28 and which are biased inwardly into engagement with the helically grooved peripheral surface of the cam wheel 26 by coiled springs 49, as shown in FIGURE 4. The coupling balls 47 normally engage in the grooves 27 and drivingly connect the cam wheel 26 to the flywheel 28. However, if the speed of rotation of the shaft 23 should decrease relatively rapidly, the inertia of the flywheel 28 causes the flywheel 28 to be moved to the right, as viewed in FIGURE 4, as will be presently explained.

Since the coupling balls 47 are yieldable inwardly, a sudden decrease in speed of the cam wheel 26 will cause the cam wheel to decelerate with respect to the relatively heavy flywheel 28 and will allow the cam wheel to rotate relative to the flywheel against the retarding action of the spring-pressed balls 47. However, since the balls 47 must travel along the helical grooves 27, the reaction developed will cause the flyweel 28 to be moved to the right, as viewed in FIGURE 4, moving the sleeve member 34 therewith and blanking the channel 40 so as to interrupt the supply of fluid under pressure to the brake cylinder 14.

Housing 13 is formed adjacent the brake cylinder 14 with an accumulator chamber 50 which is connected to a valve chamber 51 formed between the chamber 50 and the brake cylinder by a passage 52. A ball valve 53 is urged by a spring 54 into engagement with a seat provided therefor, normally sealing passage 52 with respect to the valve chamber 51. The ball valve 53 projects into the passage 51. A similar ball valve 55 is provided between the passage 56 leading to the brake cylinder 14 and the valve chamber 51. As shown in FIGURE 4, the ball elements 53 and 55 are located diametrically opposite each other and project into the valve passage 51.

Designated at 57 is a valve piston which is slidably and sealingly mounted in the passage 51 and which is formed with a reduced inner end 58 which is cammingly engageable with the ball elements 53 and 55 responsive to the inward movement of the valve member 57 to unseat the ball elements and to establish communication between passages 52 and 56. The outer end of valve member 57 is formed with an annular groove 59 which is engaged by a flange 60 projecting from the periphery of the flywheel 28, so that the piston member 57 is movable longitudinally with the flywheel. A ball detent 62 is provided in the subjacent wall of housing 13, the detent ball 62 engaging in the groove 59 to yieldably hold the valve piston 57 in the normal position thereof shown in FIGURE 4, namely, the position wherein the ball valves 53 and 55 are in sealing positions. However, when the flywheel 28 is moved to the right, as viewed in FIGURE 4, as a result of sudden deceleration of shaft 23, as above explained, the piston 57 is likewise moved to the right, unseating the ball elements 53 and 55 and connecting the interior of brake cylinder 14 to the accumulator chamber 50, allowing the brake fluid in the cylinder to escape into the accumulator chamber.

A piston 64 is provided in the chamber 50, the piston 64 being urged to the right, as viewed in FIGURE 5, by a coiled spring 65, the spring 65 being relatively light, so as to impose merely a biasing force on the piston 64 which is insufficient to prevent the discharge of the pressure fluid from the brake cylinder 14 into the accumulator chamber 50. A check valve 66 is provided in an auxiliary passage 67 connecting the accumulator chamber with the brake cylinder 14, the valve 66 opening at a predetermined fluid pressure in the accumulator chamber to allow brake fluid to return to the brake cylinder, whereby to maintain a continuous balanced or modulated pressure on the pistons in the brake cylinder, which is transmitted through the brake shoes 16, 16 by the piston rods 15, 15, to maintain a minimum braking force on the shoes. The ball valve 66 opens at a relatively low pressure, enabling the spring loaded accumulator piston 64 to maintain a continuous balanced or modulated pressure on the brake pistons.

The brake cylinder 14 is provided with a conventional bleeder valve assembly 70 which enables the brake cylinder to be bled in the usual manner whenever required.

In operation, when a skid condition develops, the shaft 23 is decelerated relatively rapidly, because of the rapid deceleration of the brake drum 11, transmitted to the shaft 23 through the driving gear 24. The sudden change in the speed of rotation of the cam wheel 26 is applied through the helical grooves 27 and the yieldable balls 47 to the flywheel 28, which tends to rotate at a relatively steady speed, causing the flywheel 28 to be moved to the right, as viewed in FIGURE 4, by the resultant reaction, as above described, cutting off communication between port 18 and port 21, and thus cutting off the supply of pressure fluid to the brake cylinder 14. It will be readily understood that the cause of the skid condition is the sudden deceleration of the wheel following the application of the brakes, possibly due to the relatively slippery underlying road surface. With the fluid pressure cut off, the application of braking force is discontinued, and simultaneously, the fluid under pressure in the brake cylinder is allowed to escape into the accumulator chamber 50 because of the opening of the ball valves 53 and 55 resulting from the movement of the valve piston 57 to the right, because of the coupling engagement of the annular ring or flange 60 with the groove 59 in the end of the piston 57. The piston 57 is moved to the right, as viewed in FIGURE 4, being disengaged from the locking ball 62, and reaching a position wherein the locking ball 62 is externally adjacent to the head or end of the piston 57. In this position, the balls 53 and 55 are held unseated, allowing the pressure fluid in the brake cylinder to flow into the accumulator chamber 50 against the relatively yielding piston 64. The check valve 66 opens at a relatively low pressure, allowing the brake fluid to return from the accumulator chamber 50 into the brake cylinder 14 to maintain a continuous balanced pressure on the brake pistons so as to maintain a minimum braking force on the brake drum 11. With the major portion of the braking force relieved, the wheel is allowed to regain traction, whereby the skid condition is automatically corrected. When the shaft 23 resumes a speed approaching that of the flywheel 28, the flywheel is moved to the left, as viewed in FIGURE 4, by the biasing spring 29, allowing the channel 40 to be returned to a position of registry with the ports 18 and 21, and the valve piston 57 is moved to the left, as viewed in FIGURE 4, allowing the balls 53 and 55 to resume their seated positions. This restores the connection between the fluid pressure supply conduit 20 and the brake cylinder 14 and allows the normal braking action to be obtained.

It will be noted that the apparatus functions automatically to cut off the supply of braking fluid and to allow the wheel to resume traction even though the operator of the vehicle continues to apply braking force to the brake pedal. Since each wheel is provided with the skid detection means above described, the wheels respond independently to skid conditions and automatically relieve the braking force on the wheels when the wheels approach said skid conditions. As a result, when the brakes are applied by operating the brake pedal in the usual manner, the wheels will receive braking force in accordance with the particular subjacent roadway conditions, and if any wheel should approach a skid condition, the braking force will be relieved thereon automatically without any further action on the part of the vehicle operator.

While a specific embodiment of an improved automobile automatic anti-skid control apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle wheel structure, a rotating brake drum, a brake shoe movable into engagement with the drum, a brake cylinder operatively connected to said shoe, a source of brake fluid under pressure, a shaft member rotatably mounted in said drum, means drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, conduit means including a normally open valve connecting said source of brake fluid to said brake cylinder, and means closing said valve responsive to the axial movement of the flywheel on the shaft member.

2. In a vehicle wheel structure, a rotating brake drum, a brake shoe movable into engagement with the drum, a brake cylinder operatively connected to said shoe, a source of brake fluid under pressure, a shaft member rotatably mounted in said drum, means drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, conduit means including a normally open valve connecting said source of brake fluid to said brake cylinder, means closing said valve responsive to the axial movement of the flywheel on the shaft member, a brake fluid release chamber, means including a normally closed release valve communicatively connecting said brake cylinder to said release chamber, and means opening said release valve responsive to said axial movement of the flywheel on the shaft member.

3. In a vehicle wheel structure, a wheel backing plate, a rotating brake drum disposed adjacent said backing plate, a brake shoe in the drum movable into engagement with the drum, a brake cylinder operatively connected to said shoe, a source of brake fluid under pressure, a shaft member rotatably mounted in said drum, internal peripheral gear teeth in the drum, a driving gear secured on said shaft member and meshing with said internal gear teeth drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, conduit means including a normally open valve connecting said source of brake fluid to said brake cylinder, and means closing said valve responsive to the axial movement of the flywheel on the shaft member.

4. In a vehicle wheel structure, a wheel backing plate, a rotating brake drum disposed adjacent said backing plate, a brake shoe in the drum movable into engagement with the drum, a brake cylinder operatively connected to said shoe, a source of brake fluid under pressure, a shaft member rotatably mounted in said drum, internal peripheral gear teeth in the drum, a driving gear secured on said shaft member and meshing with said internal gear teeth drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, conduit means including a normally open valve connecting said source of brake fluid to said brake cylinder, means closing said valve responsive to the axial movement of the flywheel on the shaft member, a brake fluid release chamber, means including a normally closed release valve communicatively connecting said brake cylinder to said release chamber, and means opening said release valve responsive to said axial movement of the flywheel on the shaft member.

5. In a vehicle wheel structure, a rotating brake drum, a brake shoe movable into engagement with said drum, a brake cylinder operatively connected to said shoe, a source of brake fluid under pressure, a shaft member rotatably mounted in said drum, means drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, a sleeve member rotatably received on said shaft member, means connecting said sleeve member to said flyweel for axial movement therewith relative to the shaft member, said sleeve member having a peripheral fluid channel thereon, housing means slidably receiving said sleeve member and having opposing ports normally registering with said channel, and conduit means including said ports and channel connecting said source of brake fluid to said brake cylinder, said flywheel being movable axially on said shaft member sufficiently to move the channel out of registry with said ports, whereby to interrupt the supply of brake fluid to said brake cylinder.

6. In a vehicle wheel structure, a rotating brake drum, a brake shoe movable into engagement with the drum, a brake cylinder operatively connected to said shoe, a source of brake fluid under pressure, a shaft member rotatably mounted in said drum, means drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, a sleeve member rotatably receiving said shaft member, means connecting said sleeve member to said flywheel for axial movement therewith relative to the shaft member, said sleeve member having a peripheral fluid channel thereon, housing means slidably receiving said sleeve member and having opposing ports normally registering with said channel, conduit means including said ports and channel connecting said source of brake fluid to said brake cylinder, said flywheel being movable axially on said shaft member sufficiently to move the channel out of registry with said ports, whereby to interrupt the supply of brake fluid to said brake cylinder, a brake fluid release chamber, means including a normally closed release valve communicatively connecting said brake cylinder to said release chamber, and means opening said release valve responsive to said axial movement of the flywheel on the shaft member.

7. In a vehicle wheel structure, a wheel backing plate, a rotating brake drum disposed adjacent said backing plate, a brake shoe in the drum movable into engagement with the drum, a brake cylinder operatively connected to said shoe, a source of brake fluid under pressure, a shaft member rotatably mounted in said drum, internal peripheral gear teeth in the drum, a driving gear secured on said shaft member and meshing with said internal gear teeth drivingly coupling said shaft member to said drum, a flywheel rotatably and slidably mounted on said shaft member, a cam wheel secured on said shaft member and having a helically grooved peripheral surface, yieldable coupling means on said flywheel engaging said peripheral surface and normally drivingly coupling said flywheel to said cam wheel, said coupling means being cooperable with the grooves in the peripheral surface of said cam wheel to move the flywheel axially on the shaft member when the shaft member decelerates relative to the flywheel, said yieldable coupling means allowing the cam wheel to rotate relative to the flywheel without axial movement of the flywheel when the rate of deceleration is relatively high, a sleeve member rotatably receiving said shaft member, means connecting said sleeve member to said flywheel for axial movement therewith relative to the shaft member, said sleeve member having a peripheral fluid channel thereon, housing means slidably receiving said sleeve member and having opposed ports normally registering with said channel, conduit means including said ports and channel connecting said source of brake fluid to said brake cylinder, said flywheel being movable axially on said shaft member sufficiently to move the channel out of registry with said ports, whereby to interrupt the supply of brake fluid to said brake cylinder, a brake fluid release chamber, means including a normally closed release valve communicatively connecting said brake cylinder to said release chamber, and means opening said release valve responsive to said axial movement of the flywheel on the shaft member.

References Cited in the file of this patent

UNITED STATES PATENTS

| | | |
|---|---|---|
| 2,107,823 | Hallot | Feb. 8, 1938 |
| 2,414,879 | Johnson | Jan. 28, 1947 |
| 2,631,696 | Yarber | Mar. 17, 1953 |
| 2,753,017 | Curl et al. | July 3, 1956 |
| 2,904,136 | Greenough | Sept. 15, 1959 |

FOREIGN PATENTS

| | | |
|---|---|---|
| 48,806 | France | May 3, 1938 |